US010649922B2

(12) United States Patent
Fukami et al.

(10) Patent No.: US 10,649,922 B2
(45) Date of Patent: May 12, 2020

(54) SYSTEMS AND METHODS FOR SCHEDULING DIFFERENT TYPES OF MEMORY REQUESTS WITH VARYING DATA SIZES

(71) Applicant: Apple Inc., Cupertino, CA (US)

(72) Inventors: Shawn Munetoshi Fukami, Newark, CA (US); Jaideep Dastidar, San Jose, CA (US); Yiu Chun Tse, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/056,376

(22) Filed: Aug. 6, 2018

(65) Prior Publication Data
US 2020/0042469 A1    Feb. 6, 2020

(51) Int. Cl.
*G06F 13/14*    (2006.01)
*G06F 13/16*    (2006.01)
*G06F 9/48*    (2006.01)

(52) U.S. Cl.
CPC ........ *G06F 13/1605* (2013.01); *G06F 9/4837* (2013.01); *G06F 9/4887* (2013.01)

(58) Field of Classification Search
CPC ... G06F 13/1605; G06F 9/4887; G06F 9/4837
See application file for complete search history.

(56) References Cited

U.S. PATENT DOCUMENTS

| | | | | |
|---|---|---|---|---|
| 6,507,886 B1* | 1/2003 | Chen | ................... | G06F 13/1631 710/310 |
| 7,054,330 B1* | 5/2006 | Chou | ...................... | H04L 47/50 370/444 |
| 7,366,854 B2* | 4/2008 | Wastlick | ............. | G06F 13/1626 711/105 |
| 8,006,244 B2* | 8/2011 | Davis | ................... | G06F 9/3851 718/100 |
| 8,930,641 B1* | 1/2015 | Kapasi | ................... | G06F 13/28 711/149 |
| 8,972,700 B2* | 3/2015 | Tran | ...................... | G06F 9/3017 712/217 |
| 9,135,179 B2 | 9/2015 | Wang | | |
| 9,558,001 B2 | 1/2017 | Khot et al. | | |
| 2003/0163671 A1* | 8/2003 | Gschwind | ............. | G06F 9/3836 712/214 |

(Continued)

*Primary Examiner* — Jing-Yih Shyu
(74) *Attorney, Agent, or Firm* — Kowert Hood Munyon Rankin and Goetzel PC; Rory D. Rankin

(57) ABSTRACT

A system and method for efficiently scheduling requests. In various embodiments, a processor sends commands such as read requests and write requests to an arbiter. The arbiter reduces latencies between commands being sent to a communication fabric and corresponding data being sent to the fabric. When the arbiter selects a given request, the arbiter identifies a first subset of stored requests affected by the given request being selected. The arbiter adjusts one or more attributes of the first subset of requests based on the selection of the given request. In one example, the arbiter replaces a weight attribute with a value, such as a zero value, indicating the first subset of requests should not be selected. Therefore, during the next selection by the arbiter, only the requests in a second subset different from the first subset are candidates for selection.

17 Claims, 7 Drawing Sheets

(56) References Cited

U.S. PATENT DOCUMENTS

| | | | |
|---|---|---|---|
| 2004/0225847 A1* | 11/2004 | Wastlick | G06F 13/1626 711/158 |
| 2010/0325327 A1* | 12/2010 | Marietta | G06F 13/1642 710/240 |
| 2014/0240326 A1* | 8/2014 | Cutter | G06F 13/00 345/502 |
| 2015/0278004 A1* | 10/2015 | Li | G11C 29/42 714/6.11 |
| 2017/0060581 A1 | 3/2017 | Patil | |

* cited by examiner

SYSTEMS AND METHODS FOR SCHEDULING DIFFERENT TYPES OF MEMORY REQUESTS WITH VARYING DATA SIZES

BACKGROUND

Technical Field

Embodiments described herein relate to the field of computing systems and, more particularly, to efficiently scheduling requests.

Description of the Related Art

Systems on chips (SoCs) are becoming increasingly complex with ever increasing numbers of agents within a typical SoC and available endpoints. Examples of agents include one or more of multimedia engines, digital signal processors (DSPs) and processing units, each with one or more of a central processing unit (CPU) and a data parallel processor like a graphics processing unit (GPU). Endpoints include input/output (I/O) peripheral devices such as memory devices, communication interfaces such as radio communication interfaces, speakers, displays and so on. Data is shared among the different agents of the SoC and among the available endpoints.

Typically, an interconnect transports transactions from a source, such as an agent, to a destination such as another agent or an endpoint. In some cases, the interconnect is a communication fabric. One or more queues, data stores and other data storage components are included in the interconnect for providing intermediate storage for commands, messages, and data in transit between a source and a destination. The management of the intermediate storage and the number outstanding transactions for each of the multiple sources in the computing system becomes more complex when latencies grow between sending commands to the interconnect and sending corresponding data to the interconnect.

In view of the above, efficient methods and mechanisms for efficiently scheduling requests are desired.

SUMMARY

Systems and methods for efficiently scheduling requests are contemplated. In various embodiments, a computing system includes a communication fabric for routing traffic among one or more agents and one or more endpoints. In some embodiments, the communication fabric (or fabric) includes one or more intermediate buffers for storing commands and corresponding data during transport. In some embodiments, the one or more intermediate buffers are located in queues distributed across the fabric and one or more data stores. Each agent and each endpoint is both a source and a destination for transactions depending on the direction of traffic flow through the fabric.

In various embodiments, one or more of the agents and endpoints include an arbiter for scheduling read requests and write requests. The arbiter receives read requests and write requests from one or more processors to send across the fabric. The arbiter selects a given request for processing from multiple stored requests based on one or more attributes of the multiple stored requests. In an embodiment, the one or more attributes include a weight and an indication of a data size associated with the request. In some embodiments, the arbiter identifies a first subset of stored requests affected by the given request being selected. For example, in an embodiment, the arbiter accesses a table entry of a table based on an identifier of the given request. The table entry stores identifiers of stored requests affected by selection of the given request. In one embodiment, each request of the first subset of requests is determined to be affected by the selection of the given request due to being a same type of read request or write request as the given request.

In various embodiments, the arbiter adjusts one or more attributes of a second subset of requests based on not being affected by the selection of the given request. Since the second subset of requests is not affected, it includes different requests than those in the first subset of requests. When the given request is a write request, in one embodiment, the first subset of requests includes the remaining unselected write requests and the second subset of requests includes the remaining read requests. In an embodiment, the arbiter increments a weight of each of the requests in the second subset.

In various embodiments, the arbiter adjusts one or more attributes of the first subset of requests based on being affected by the given request being selected. In an embodiment, the arbiter replaces a weight attribute with a value indicating the first subset of requests should not be selected based on one or more attributes of the multiple stored requests. For example, the arbiter replaces the weight attribute with a zero value for each request in the first subset. Therefore, during the next selection by the arbiter, only the requests in the second subset are candidates for selection. By doing so, the latencies reduce between commands being sent to the fabric and corresponding data being sent to the fabric. The reduced latencies simplify the management of the intermediate storage in the fabric and the number outstanding transactions for each of the multiple sources in the computing system.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
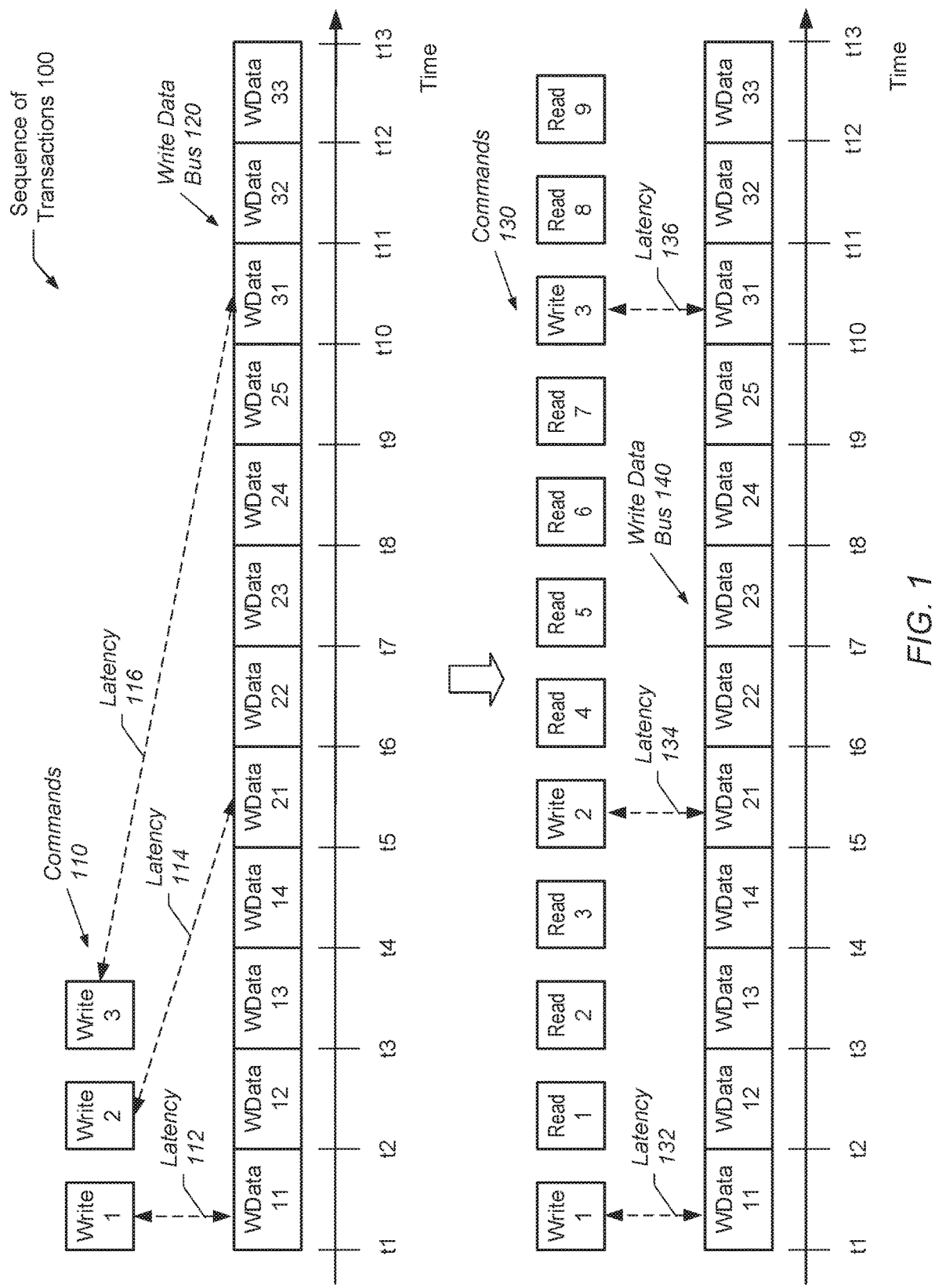
FIG. 1 is a block diagram of one embodiment of a sequence of transactions.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of a sequence of transactions 100 is shown. In the illustrated embodiment, commands 110 include three write requests labeled as "Write 1," "Write 2," and "Write 3." The first write request indicated by "Write 1" is sent at time marked as "t1." In various embodiments, the points in time are the start of clock cycles. As shown, the next two write requests are sent at time t2 and time t3, respectively. Therefore, the three write requests are sent in consecutive cycles with no intervening other requests.

The write data bus 120 includes the write data for the three write requests of commands 110. As shown, the first write request "Write 1" has write data indicated as "WData 11" to "WData 14." Therefore, sending the write data for the first write request requires four cycles indicated by the duration of time between time t1 and time t5. The latency 112 between sending the first write request for processing at time t1 and sending the beginning of the corresponding write data for processing at time t1 is zero. In contrast, each of the second write request and the third write request have non-zero latencies. Although in the example, the latencies are measured from a first point in time when a write request is sent and a second point in time when a first block or a first subunit of data corresponding to the write request is sent, in other examples, a different second point in time is used. In a second example, the particular block of data or the particular subunit of data selected for measuring the second point in time is the second block of data such as "WData 12." In a third example, the selected block of data is the third block of data such as "Wdata 13." In yet other examples, the selected block of data is the lastblock of data such as "Wdata 14."

The second write request "Write 2" has write data indicated as "WData 21" to "WData 25." Therefore, sending the write data for the second write request requires five cycles indicated by the duration of time between time t5 and time t10. The latency 114 between sending the second write request for processing at time t2 and sending the beginning of the corresponding write data for processing at time t5 is three cycles. The write data "WData 11" to "WData 14" for the first write request needs to finish being sent for processing before the write data "WData 21" to "WData 25" for the second write request can begin being sent.

In a similar manner as the above, third write request "Write 3" has write data indicated as "WData 31" to "WData 33." Therefore, sending the write data for the third write request requires three cycles indicated by the duration of time between time t10 and time t13. The latency 116 between sending the third write request for processing at time t3 and sending the beginning of the corresponding write data for processing at time t10 is seven cycles. The write data "WData 11" to "WData 14" for the first write request and the write data "WData 21" to "WData 25" for the second write request needs to finish being sent for processing before the write data "WData 31" to "WData 33" for the third write request can begin being sent. As described earlier, the manner for measuring the latencies changes based on the selected block of data to use for measuring the second point in time. However, regardless of the selection, the latencies appreciably increase for write requests sent at later points in time, since the write data of previous write requests are finished being sent before the write data of the later requests begin to be sent.

When the write requests are delayed in a particular manner from being sent for processing, the latencies are reduced. As shown, commands 130 include three write requests labeled as "Write 1," "Write 2," and "Write 3." The first write request indicated by "Write 1" is sent at time marked as "t1." The second write request indicated by "Write 2" is sent at time t5, and the third write request indicated by "Write 3" is sent at time t10. Therefore, the three write requests are not sent in consecutive cycles and they do have intervening other requests. For example, commands 130 include nine read requests marked as "Read 1" to "Read 9."

In the illustrated embodiment, there are three read requests marked as "Read 1" to "Read 3" between the first two write requests. There are four read requests marked as "Read 4" to "Read 7" between the second and third write requests. There are two read requests marked as "Read 8" to "Read 9" after the third write request. The write data bus 140 includes the write data for the three write requests of commands 130. In an embodiment, the requested data of the nine read requests are returned on a separate read data bus. As shown, the write data is placed on the write data bus 140 in a same order as the earlier example with the write data bus 120. However, the commands are issued in a same cycle as the corresponding write data is issued. Therefore, each of the latencies 132, 134 and 136 are zero. The reduced latencies simplify the management of the intermediate storage in the fabric or other interconnect used to transport the commands and data. The reduced latencies also simplify the management of the number of outstanding transactions for each of the multiple sources in a computing system. As described earlier, the manner for measuring the latencies changes based on the selected block of data to use for measuring the second point in time. However, regardless of the selection, each of the latencies 132, 134 and 136 remain zero. For example, if the last data block is selected for the second point in time, then the first write request "Write 1" is sent at time t4 when the data "WData 14" is sent. In such a case, latency 132 remains zero and the issue of the other requests are shifted down the timeline accordingly.

Figure 2:
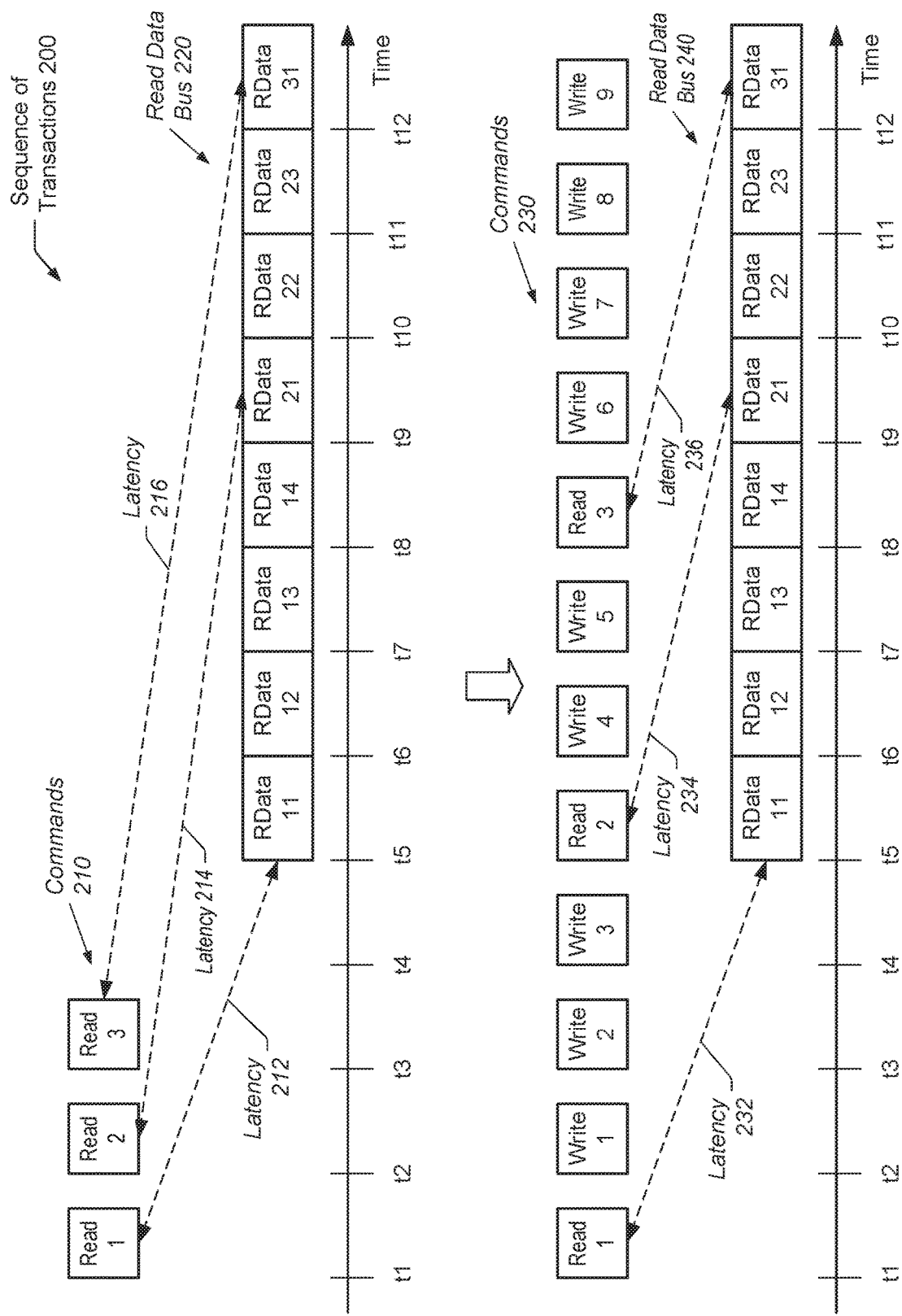
FIG. 2 is a block diagram of one embodiment of a sequence of transactions.

Turning now to FIG. 2, a generalized block diagram of one embodiment of a sequence of transactions 200 is shown. In the illustrated embodiment, commands 210 include three read requests labeled as "Read 1," "Read 2," and "Read 3." The first Read request indicated by "Read 1" is sent at time marked as "t1." In various embodiments, the points in time are the start of clock cycles (or cycles). As shown, the next two Read requests are sent at time t2 and time t3, respectively. Therefore, the three Read requests are sent in consecutive cycles with no intervening other requests.

The Read data bus 220 includes the requested Read data for the three Read requests of commands 210. As shown, the first Read request "Read 1" has Read data indicated as "RData 11" to "RData 14." Therefore, sending the Read data for the first Read request requires four cycles indicated by the duration of time between time t5 and time t9. However, there are an additional four cycles from time t1 to time t5 for the read request "Read 1" to be sent from a targeted destination onto an interconnect before reaching the read data bus 220. In an embodiment, the additional four cycles is a prediction for the latency between read requests being sent and being processed by the targeted destination. The latency 212 between sending the first Read request for processing at time t1 and receiving the beginning of the corresponding Read data at time t5 is four cycles.

The second Read request "Read 2" has Read data indicated as "RData 21" to "RData 23." With the predicted four cycles as described above, the latency 214 between sending the second Read request for processing at time t2 and receiving the beginning of the corresponding Read data on the read data bus 220 for processing at time t9 is seven cycles. The Read data "RData 11" to "RData 14" for the first Read request needs to finish being received for processing before the Read data "RData 21" to "RData 23" for the second Read request can begin being received.

In a similar manner as the above, third Read request "Read 3" has Read data indicated as "RData 31." The latency 216 between sending the third Read request for processing at time t3 and receiving the beginning of the corresponding Read data for processing at time t12 is nine cycles. The Read data "RData 11" to "RData 14" for the first Read request and the Read data "RData 21" to "RData 23" for the second Read request needs to finish being received for processing before the Read data "RData 31" for the third Read request can begin being received.

When the read requests are delayed in a particular manner from being sent for processing, the latencies are reduced. As shown, commands 230 include three read requests labeled as "Read 1," "Read 2," and "Read 3." The first read request indicated by "Read 1" is sent at time marked as "t1." The second read request indicated by "Read 2" is sent at time t5, and the third read request indicated by "Read 3" is sent at time t8. Therefore, the three read requests are not sent in consecutive cycles and they do have intervening other requests. For example, commands 230 include nine write requests marked as "Write 1" to "Write 9."

In the illustrated embodiment, there are three write requests marked as "Write 1" to "Write 3" between the first two read requests. There are two write requests marked as "Write 4" to "Write 5" between the second and third read requests. There are four write requests marked as "Write 6" to "Write 9" after the third read request. The read data bus 240 includes the read data for the three read requests of commands 230. In an embodiment, the requested data of the nine write requests are returned on a separate write data bus. As shown, the read data is placed on the read data bus 240 in a same order as the earlier example with the read data bus 220. However, the commands are issued in cycles closer to the cycles where corresponding read data is received. Therefore, each of the latencies 232, 234 and 236 are four cycles. The reduced latencies simplify the management of the intermediate storage in the fabric or other interconnect used to transport the commands and data. The reduced latencies also simplify the management of the number of outstanding transactions for each of the multiple sources in a computing system.

Figure 3:
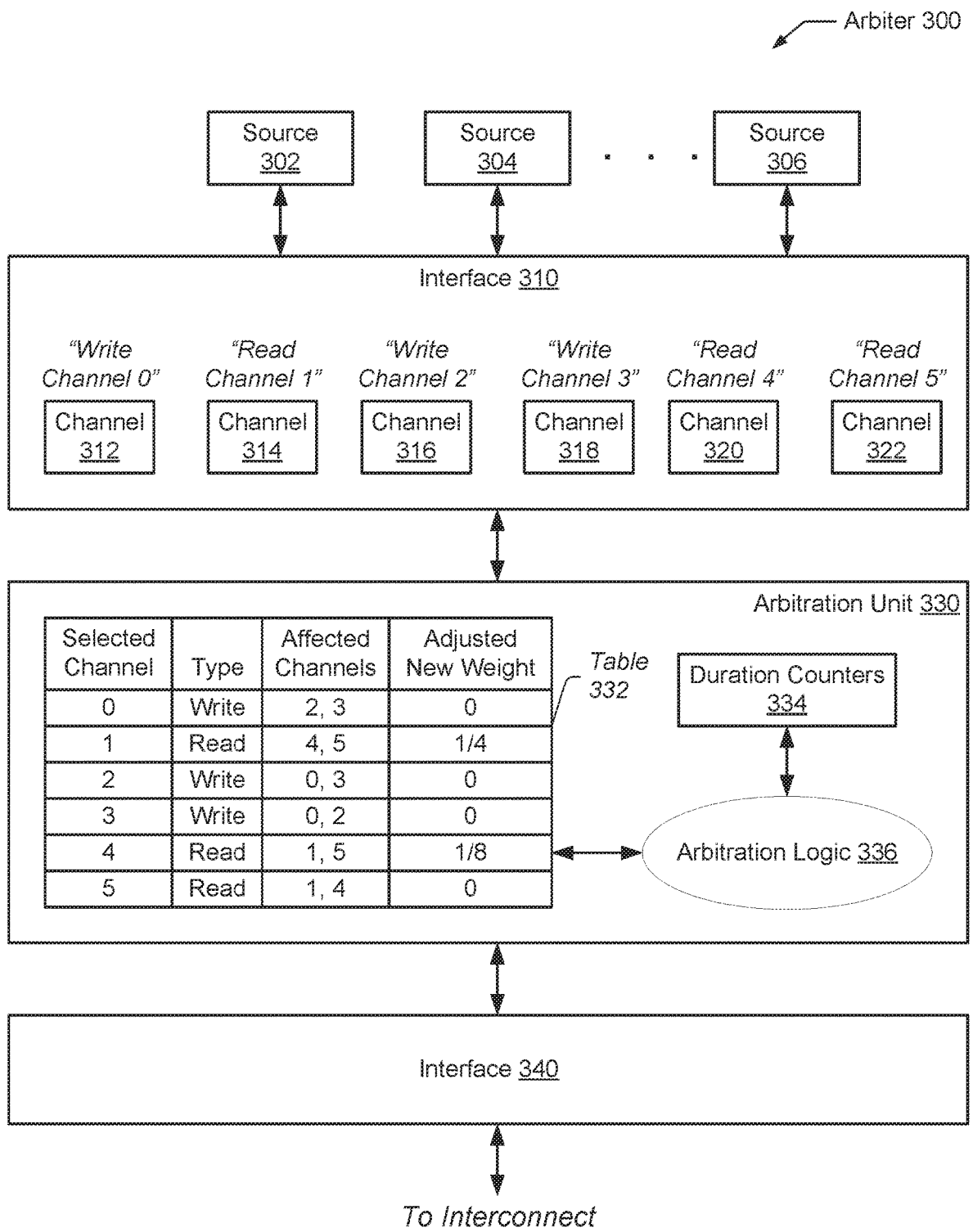
FIG. 3 is a block diagram of one embodiment of an arbiter.

Referring to FIG. 3, a generalized block diagram of one embodiment of an arbiter 300 is shown. In the illustrated embodiment, arbiter 300 includes an interface 310 for receiving read requests and write requests generated by sources 302, 304 and 306. Although three sources are shown, in various embodiments, any number of sources are included for generating read requests and write requests. In some embodiments, the sources 302-306 are processors or controllers within a processing unit in a computing system capable of generating access requests for data. In some embodiments, each of the sources 302-306 is a functional block or unit within a processor core.

In an embodiment, interface 310 groups the received requests based on one or more parameters such as request type. As shown, interface 310 includes six channels 312-322. In the illustrated embodiment, channels 312, 316 and 318 are write channels labeled as "Write Channel 0", "Write Channel 2" and "Write Channel 3." Channels 314, 320 and 322 are read channels labeled as "Read Channel 1", "Read Channel 4" and "Read Channel 5." In some embodiments, each of the channels 312-322 includes one or more queues for storing the received requests. In other embodiments, the arbitration unit 330 includes one or more queues for storing the received requests based on the channel groupings.

In one embodiment, arbitration unit 330 reorders the received requests for efficient out-of-order servicing. In another embodiment, arbitration unit 330 maintains an in-order servicing within each of the channels 312-322. In various embodiments, arbitration unit 330 includes status and control registers (not shown) for storing control parameters, and arbitration logic 336 for selecting requests from the channels 312-322 for processing. The functionality of arbitration unit 330 is implemented by hardware circuitry and/or software.

In some embodiments, arbitration logic 336 selects the oldest stored request. In other embodiments, selection by arbitration logic 336 is based on an algorithm computing weights. In an embodiment, arbitration logic 336 uses a combination of control logic and sequential elements to combine factors for the stored requests such as an age, a priority level, a quality-of-service parameter, a source identifier, an application identifier or type, such as a real-time application, and so forth. In one embodiment, the stored request with the greatest weight based on the algorithm is selected by arbitration logic 336. Arbitration logic 336 sends the selected request to an interconnect via interface 340. In some embodiments, the interconnect is a communication fabric and interface 340 includes logic to support bus protocols of the communication fabric.

In some embodiments, arbitration logic 336 accesses table 332 to identify a first subset of stored requests affected by the selection made by arbitration logic 336. In an embodiment, a table entry of table 332 is accessed based on an identifier of the selected given request or other information associated with the selected given request. In one embodiment, each table entry of table 332 stores an indication of the selected channel of channels 312-322, a request type (write or read), a list of channels affected by the currently selected request, and an adjusted weight for the affected channels.

In one example, if a write request in "Write Channel 2" is selected, then arbitration logic 336 accesses the third row (entry) from the top of table 332 and determines channels 0 and 3 are affected by the selection. The weights for "Write Channel 0" and "Write Channel 3" are replaced with a zero value. Therefore, in a next clock cycle, arbitration logic 336 uses weight values of zero for "Write Channel 0," "Write Channel 2" and "Write Channel 3." Accordingly, the only candidates for selection in this next clock cycle are requests from "Read Channel 1," "Read Channel 4" and "Read Channel 5."

In some embodiments, arbitration logic 336 maintains the indication of the channel of the selected request and adjusts the weight for that channel in a same manner as for the channels identified in table 332. In other embodiments, the indication of the selected channel is included with the indications of the other channels affected by the selection. For example, in an embodiment, the third row (entry) of table 332 includes a "2" along with "0, 3."

In another example, if a read request in "Read Channel 4" is selected, then arbitration logic 336 accesses the fifth row (entry) from the top of table 332 and determines channels 1 and 5 are affected by the selection. The weights for "Read Channel 1" and "Read Channel 5" are replaced with one eighth of their current weights. Therefore, in a next clock cycle, arbitration logic 336 uses appreciably smaller weight values of zero for "Read Channel 1," "Read Channel 4" and "Read Channel 5." Accordingly, the candidates for selection by arbitration logic 336 in the next clock cycle are likely requests from "Write Channel 1," "Write Channel 2" and "Write Channel 3."

In some embodiments, a time period is determined that the first subset of requests remains affected by the current selection by arbitration logic 336. In various embodiments, the time period is based on a data size corresponding to the currently selected request. In one embodiment, the time period is a number of cycles needed to send the entire write data from a source to a destination corresponding to the selected request. In another embodiment, the time period is the number of cycles to send entire requested data from a targeted destination to a requesting source in addition to a number of cycles predicting the latency between read requests being sent and being processed by the targeted destination. In some embodiments, a counter of duration counters 334 is set to the number of cycles and decremented each clock cycle. For the duration of the time period, one or more attributes of the first subset of requests are adjusted based on being affected by the selection made by arbitration logic 336.

Figure 4:
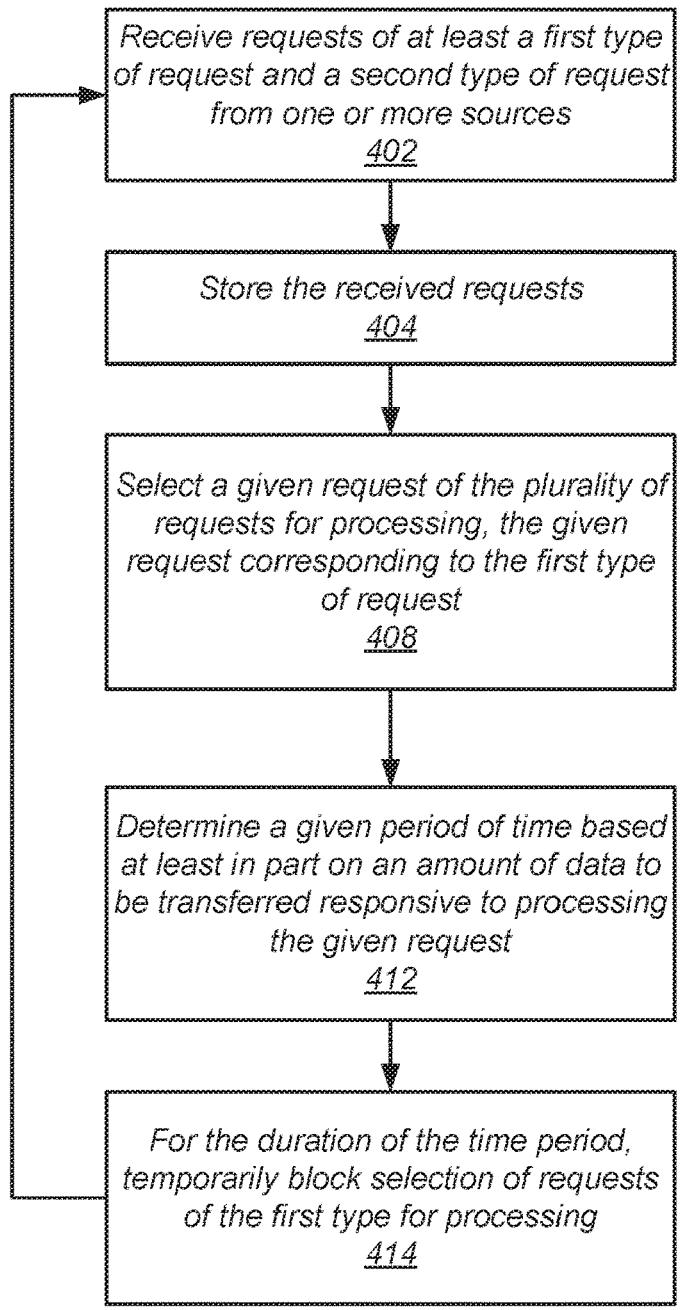
FIG. 4 is a flow diagram of one embodiment of a method for scheduling requests.

Referring now to FIG. 4, a generalized flow diagram of one embodiment of a method 400 for scheduling requests is shown. For purposes of discussion, the steps in this embodiment (as well as for FIG. 5) are shown in sequential order. However, in other embodiments some steps may occur in a different order than shown, some steps may be performed concurrently, some steps may be combined with other steps, and some steps may be absent.

Requests of at least a first type of request and a second type of request are received from one or more sources (block 402). In an embodiment, the first type of request is a write request and the second type of request is a read request. In another embodiment, the first type of request is a read request and the second type of request is a write request. In some embodiments, each of the sources is capable of generating memory access requests for data stored in a memory such as a system memory. In other embodiments, the sources are processors or controllers within an agent or an endpoint in a computing system capable of generating access requests for data in another agent or endpoint. In some embodiments, each of the sources is a functional block or unit within a processor core.

The received requests are stored (block 404). In an embodiment, the received requests are stored in queues. In some embodiments, the received requests are stored in groups of flip-flops or other types of registers, in random access memory (RAM) cells, in a content addressable memory (CAM) structure, or other. A given request is selected for processing, and the given request corresponds to the first type of request (block 408). In some embodiments, the given request is selected based on one or more attributes of the stored requests. In some embodiments, the selected request is the oldest stored request. In other embodiments, selection is based on an algorithm computing weights to sort the stored requests. In an embodiment, a combination of control logic and sequential elements is used to combine a combination of factors for the stored requests such as an age, a priority level, a quality-of-service parameter, a source identifier, an application identifier or type, such as a real-time application, and so forth. In one embodiment, the stored request with the greatest attribute based on the algorithm is selected. The attribute is indicative of one of multiple priorities.

A given period of time based at least in part on an amount of data to be transferred responsive to processing the given request is determined (block 412). In various embodiments, the given period of time is based on a data size corresponding to the given request. In one embodiment, the given period of time is a number of cycles needed to send the entire data corresponding to the given request. For example, if a write request includes write data with a size of 256 bytes and the write data bus transports 64 bytes per cycle, then the given period of time is 4 cycles. In another example, if a read request includes requested data with a size of 256 bytes, the read data bus transports 64 bytes per cycle, and a predicted latency for the destination to begin sending the requested data is 3 cycles, then the given period of time is 7 cycles.

In some embodiments, a counter is initialized with the number of cycles and decremented each clock cycle (or cycle). In other embodiments, the counter is reset to zero and the counter is incremented each cycle. The time period ends when the counter reaches a threshold such as zero when the counter decrements or the number of cycles when the counter increments. For the duration of the given period of time, selection of requests of the first type are temporarily blocked for processing (block 414). In some embodiments, requests of the first type are caused to have a lowest priority of the multiple priorities. Therefore, during the next selection, only the requests of a different type than the first type are candidates for selection.

By removing requests of the first type for upcoming selections during the given period of time, the latencies reduce between commands being sent to service the requests and corresponding data being sent to service the requests. The reduced latencies simplify both the management of the intermediate storage used during the transport of the commands and data and the management of the number outstanding transactions for each of the multiple sources in the computing system.

In an embodiment, a table entry of a table is accessed based on an identifier of the given request or other information associated with the given request. In one embodiment, the table entry stores identifiers of the first type or otherwise identify requests of the first type. In some embodiments, one or more attributes of requests of a type different from the first type are adjusted based on being a type different from the first type. In an embodiment, a weight or attribute of each of these requests is incremented, or otherwise updated. These requests are not blocked from selection during the given period of time. In some embodiments, even when there are no stored requests of a type different from the first type, selection of requests of the first type for processing are still blocked during the given period of time. Therefore, in some cases, during a portion or all of the given period of time, no requests are selected for processing even if the only stored requests are requests of the first type.

Figure 5:
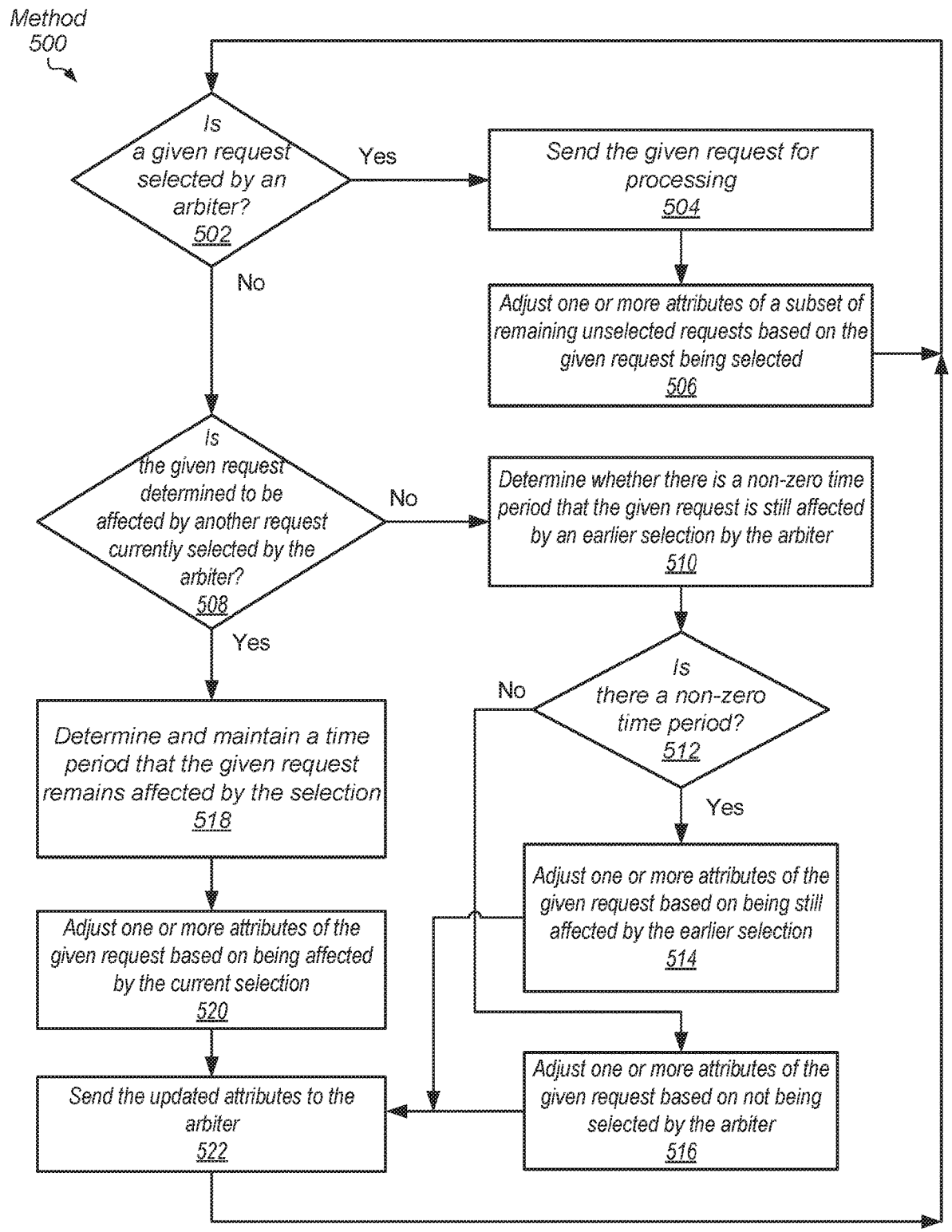
FIG. 5 is a flow diagram of one embodiment of a method for scheduling requests.

Referring now to FIG. 5, a generalized flow diagram of one embodiment of a method 500 for scheduling requests is shown. In various embodiments, an arbiter is used for scheduling read requests and write requests. The arbiter selects requests for processing from multiple stored requests based on one or more attributes of the multiple stored requests. In an embodiment, the one or more attributes include a weight and an indication of a data size associated with the request. If a given request is selected by an arbiter ("yes" branch of the conditional block 502), then the given request is sent for processing (block 504).

One or more attributes of a subset of remaining unselected requests are adjusted based on the given request being selected (block 506). As described earlier, in an embodiment, the arbiter accesses a table entry of a table based on an identifier of the given request or other information associated with the given request. In one embodiment, the table entry stores identifiers of stored requests affected by selection of the given request. In other embodiments, other information used to identify stored requests is stored in the table entry. In one embodiment, each request of the identified subset of requests is determined to be affected by the selection of the given request due to being a same type of read request or write request as the given request. Afterward, control flow of method 500 returns to the conditional block 502 where it is determined whether the given request is selected by the arbiter such as in a subsequent clock cycle.

If a given request is not selected by the arbiter ("no" branch of the conditional block 502), and if the given request is not determined to be affected by another request currently selected by the arbiter ("no" branch of the conditional block 508), then it is determined whether there is a non-zero time period that the given request is still affected by an earlier selection by the arbiter (block 510). For example, if the given request is a write request, another write request was selected by the arbiter two cycles ago, and the time period was determined to be six cycles, then the time period has a non-zero value of four remaining cycles. The given request would still be affected the selection of the other write request for four more cycles.

If there is not a non-zero time period ("no" branch of the conditional block 512), then one or more attributes of the given request are adjusted based on not being selected by the arbiter (block 516). In an embodiment, the arbiter increments a weight of each of the requests in a second subset of requests not affected by the current selection. However, if there is a non-zero time period ("yes" branch of the conditional block 512), then one or more attributes of the given request are adjusted based on being still affected by the earlier selection (block 514). In an embodiment, the arbiter replaces the weight attribute with a zero value for each request in the first subset such as the given request. Therefore, during the next selection by the arbiter, the given request is not a candidate for selection by the arbiter. Control flow of method 500 moves from either block 514 or 516 to block 522 where the updated attributes are sent to the arbiter. Afterward, control flow of method 500 returns to the conditional block 502 where it is determined whether the given request is selected by the arbiter such as in a subsequent clock cycle.

If the given request is not selected by the arbiter ("no" branch of the conditional block 502), and if the given request is determined to be affected by another request currently selected by the arbiter ("yes" branch of the conditional block 508), then a time period that the given request remains affected by the selection is determined and maintained (block 518). As described earlier, in various embodiments, the time period is based on a data size corresponding to the selected request. In one embodiment, the time period is a number of cycles needed to send the entire data corresponding to the selected request in order to service the selected request. In some embodiments, a counter is initialized with the number of cycles and decremented each cycle. One or more attributes of the given request are adjusted based on being affected by the current selection (block 520). In some embodiments, the weight attribute is replaced with a zero value for each request in the first subset. Therefore, during the next selection, only the requests in the second subset are candidates for selection.

Figure 6:
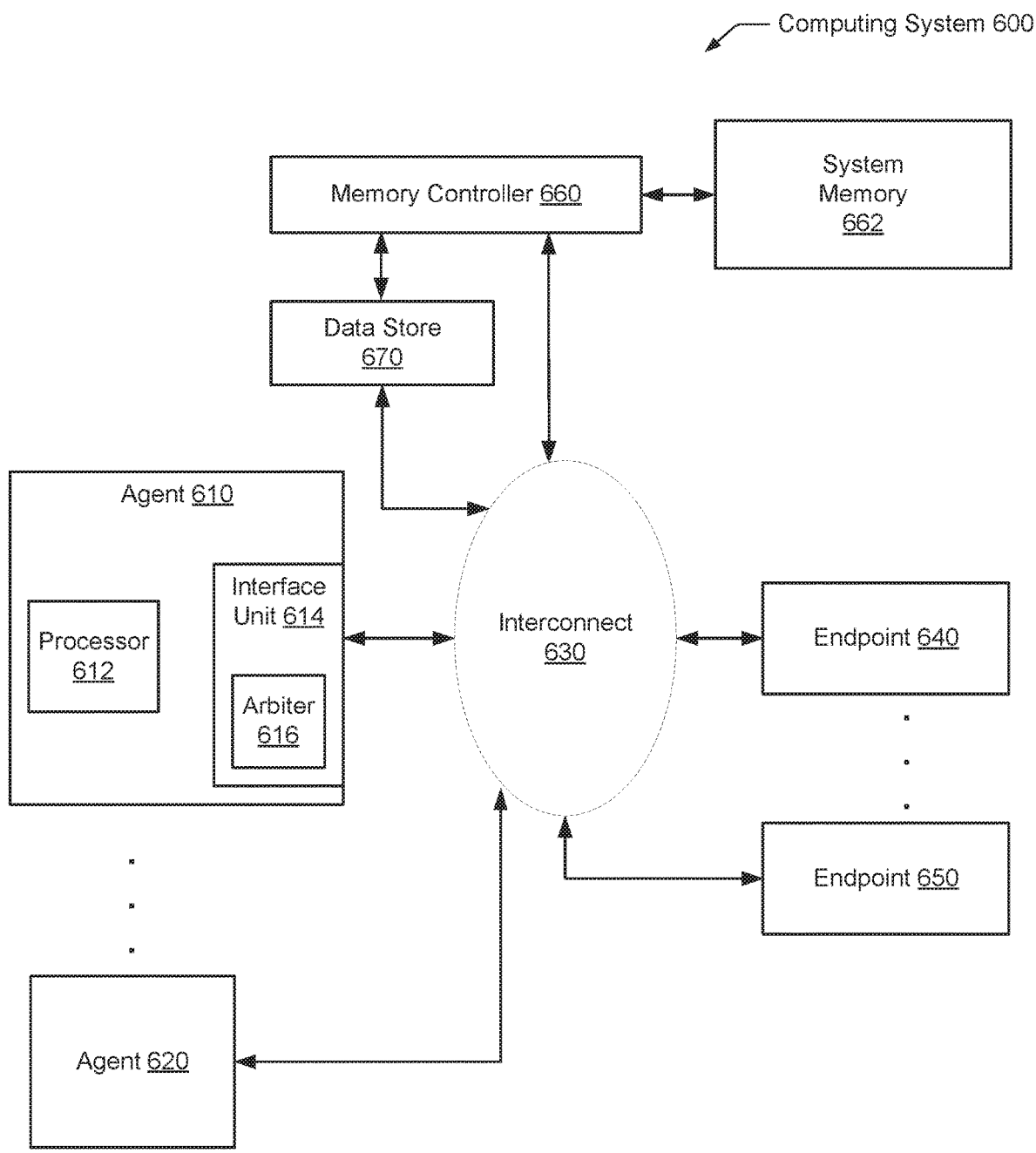
FIG. 6 is a block diagram of one embodiment of a computing system.

Referring to FIG. 6, a generalized block diagram of one embodiment of a computing system 600 is shown. In the illustrated embodiment, interconnect 630 routes traffic among agents 610-620 and endpoints 640-650. In some embodiments, interconnect 630 is a communication fabric (or fabric). In an embodiment, data store 670 is used to store one or more intermediate buffers for storing transactions and data in traffic flowing among agents 610-620, endpoints 640-650 and system memory 662. In some embodiments, one or more of agents 610-620 and endpoints 640-650 include an interface unit such as interface unit 614 in agent 610. As shown, in an embodiment, interface unit 614 includes an arbiter 616 for selecting one or more requests generated by a processor 612 in agent 610.

In various embodiments, the computing system 600 is a system on a chip (SoC) that includes multiple types of integrated circuits on a single semiconductor die, each integrated circuit providing a separate functionality. In some embodiments, computing system 600 is also referred to as an application specific integrated circuit (ASIC), or an apparatus. In other embodiments, the agents 610-620 and endpoints 640-650 are individual dies within a package such as a multi-chip module (MCM). In yet other embodiments, the agents 610-620 and endpoints 640-650 are individual dies or chips on a printed circuit board.

Clock sources, such as phase lock loops (PLLs), interrupt controllers, and so forth are not shown in FIG. 6 for ease of illustration. It is also noted that the number of components of the computing system 600 vary from embodiment to embodiment. In other embodiments, there are more or fewer of each component than the number shown for the computing system 600. In an embodiment, each of the agents 610-620 is a processor complex. The term "processor complex" is used to denote a configuration of one or more processor cores using local storage (not shown), such as a local shared cache memory subsystem, and capable of processing a workload together. For example, in an embodiment, the workload includes one or more programs comprising instructions executed by processor 612. Any instruction set architecture is implemented in various embodiments.

Each of the agents 610-620 includes a processor such as processor 612. Although a single processor is shown, in various embodiments, multiple processors are used, each with one or more processor cores. Processor 612 is one or more of a central processing unit (CPU), a data parallel processor like a graphics processing units (GPU), a digital signal processors (DSP), a multimedia engine, and so forth. In some embodiments, components within agent 620 are similar to components in agent 610. In other embodiments, components in agent 620 are designed for lower power consumption, and therefore, include control logic and processing capability producing less performance. In such embodiments, supported clock frequencies are less than supported clock frequencies in agent 610. In addition, one or more of the processor cores in agent 620 include a smaller number of execution pipelines and/or functional blocks for processing relatively high power consuming instructions than what is supported by the processor cores in agent 610.

In various embodiments, agents 610-620 and endpoints 640-650 transfer commands and data to one another and to memory controller 660 through interconnect 630. In some embodiments, interconnect 630 is a communication fabric (or fabric), which includes multiple levels of fabric mulitplexers (or muxes). In such embodiments, agents 610-620 and endpoints 640-650 include fabric interface units such as interface unit 614. Different types of traffic flows independently through a communication fabric. In some embodiments, a communication fabric utilizes a single physical fabric bus to include a number of overlaying virtual channels, or dedicated source and destination buffers, each carrying a different type of traffic. Each channel is independently flow controlled with no dependence between transactions in different channels. In other embodiments, the communication fabric is packet-based, and may be hierarchical with bridges, cross bar, point-to-point, or other interconnects.

In various embodiments, interconnect 630 uses one or more bus protocols for transferring commands and data, enforcing an order between transactions with particular transaction types, and ensuring cache coherence among the different agents 610-620 and endpoints 640-650. The supported communication protocols determine allowable transfer sizes, supported burst transfer sizes, supported directions for simultaneous transfers, allowable number of outstanding requests while sending more requests, support of out-of-order completions, supported clock domains, supported interrupt mechanisms, and so forth.

Endpoints 640-650 are representative of any number and type of components coupled to interconnect 630. For example, in some embodiments, endpoints 640-650 include one or more cameras, flash controllers, display controllers, media controllers, graphics units, communication interfaces such as radio communication interfaces, and/or other devices. Endpoints 640-650 are also representative of any number of input/output (I/O) interfaces or devices and provide interfaces to any type of peripheral device implementing any hardware functionality included in computing system 600. For example, in an embodiment, any of the endpoints 640-650 connect to audio peripherals such as microphones, speakers, interfaces to microphones and speakers, audio processors, digital signal processors, mixers, etc. Other I/O devices include interface controllers for various interfaces external to computing system 600, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices include networking peripherals such as media access controllers (MACs).

In yet other embodiments, one or more of endpoints 640-650 include memory controllers for interfacing with system memory or separate memory such as a portable flash memory device. As shown, memory controller 660 is used to interface with system memory 662. Memory controller 660 includes any number of memory ports, generates proper clocking to memory devices, and interfaces to system memory 662. System memory 662 includes one or more of dynamic random access memory (DRAM) such as synchronous DRAM (SDRAM) (including mobile versions of the SDRAMs such as mDDR3, etc., and/or low power versions of the SDRAMs such as LPDDR4, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc.

In some embodiments, data store 670 includes one or more data stores such as a data store for write data being sent to system memory 662 via memory controller 660 and response data being sent from system memory 662 via memory controller 660. In some embodiments, data stored in data store 670 is stored in one or more of flip-flops or other types of registers, one of a variety of random access memory (RAM) cells, content addressable memory (CAM) structure, or other. Data stored in data store 670 include commands and corresponding data during transport between sources and destinations. Sources include any one of agents 610-620 and endpoints 640-650.

In various embodiments, one or more of agents 610-620 and endpoints 640-650 use an arbiter, such as arbiter 616, to reduce latencies between commands being sent to interconnect 160 and corresponding data being sent to interconnect 160. The reduced latencies simplify the management of the intermediate storage, such as data store 670, and the number outstanding transactions for each of the multiple sources such as agent 610, which includes arbiter 616 for reducing the latencies. When arbiter 616 selects a given request generated by processor 612, arbiter 616 identifies a first subset of stored requests affected by the given request being selected. Arbiter 616 adjusts one or more attributes of the first subset of requests based on the selection of the given request. In one example, arbiter 616 replaces a weight attribute with a value, such as a zero value, indicating the first subset of requests should not be selected. Therefore, during the next selection by arbiter 616 in a subsequent clock cycle, only the requests in a second subset different from the first subset are candidates for selection.

Figure 7:
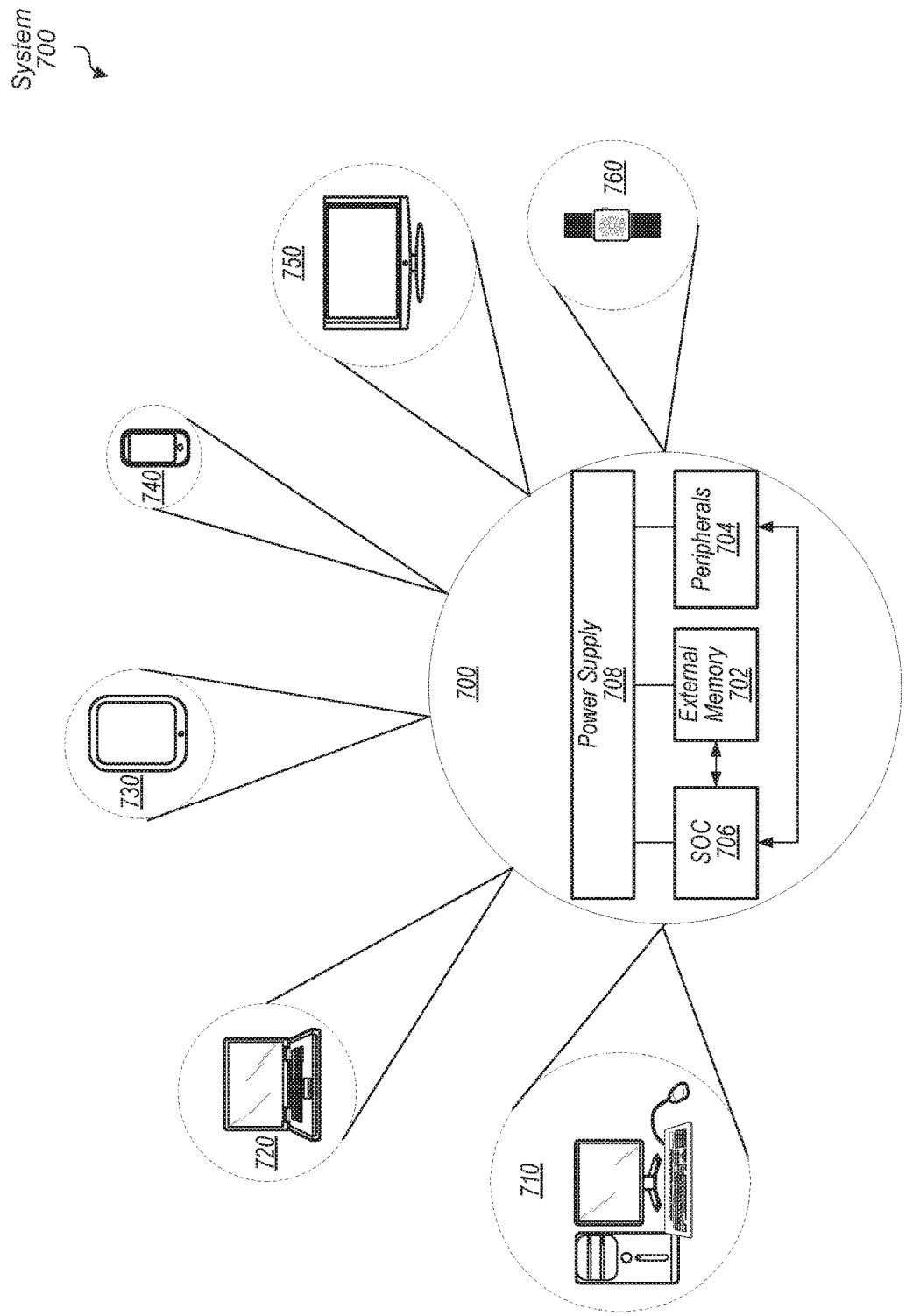
FIG. 7 is a block diagram of one embodiment of a system.

Turning next to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box coupled to a television), wrist watch or other wearable item 760, or otherwise. Other devices are possible and are contemplated. In the illustrated embodiment, the system 700 includes at least one instance of a system on chip (SoC) 706 which includes multiple agents, multiple endpoints, a communication fabric, one or more data stores, and an arbiter within one or more of the agents and endpoints for reducing latencies between commands being sent to the fabric and corresponding data being sent to the fabric. For example, in some embodiments, SoC 706 includes components similar to computing system 600 (of FIG. 6). In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer). In some embodiments, more than one instance of SoC 706 is included (and more than one external memory 702 may be included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

The invention claimed is:

1. An apparatus comprising:
a first interface configured to receive a plurality of requests comprising at least a first type of request and a second type of request; and
control logic configured to:
store the plurality of requests;
select a given request of the plurality of requests for processing, the given request corresponding to the first type of request; and
temporarily block selection of requests of a same memory access type as the first type for processing, wherein the temporary block is for a given period of time that is determined based at least in part on an amount of data to be transferred responsive to processing the given request.

2. The apparatus as recited in claim 1, wherein either:
the first type of request is a read request and the second type of request is a write request; or
the first type of request is a write request and the second type of request is a read request.

3. The apparatus as recited in claim 1, wherein each of the plurality of requests has a corresponding attribute indicative of one of a plurality of priorities.

4. The apparatus as recited in claim 3, wherein said temporary block temporarily causes requests of the first type to have a lowest priority of the plurality of priorities.

5. The apparatus as recited in claim 1, further comprising a table comprising a plurality of entries, wherein each entry of the table identifies at least a type of request, an amount of data, and an attribute indicative of one of a plurality of priorities.

6. The apparatus as recited in claim 1, wherein the control logic is further configured to determine the given period of time based on a predicted amount of time to receive read response data when processing the given request as a read request.

7. The apparatus as recited in claim 1, wherein the control logic is further configured to block selection of requests of the first type for processing during the given period of time even if the plurality of requests for processing only comprise requests of the first type.

8. A method, comprising:
receiving, by a first interface, a plurality of requests comprising at least a first type of request and a second type of request;
storing, by control logic, the plurality of requests;
selecting, by the control logic, a given request of the plurality of requests for processing, the given request corresponding to the first type of request;
temporarily blocking selection of requests of a same memory access type as the first type for processing, wherein the temporary block is for a given period of time that is determined based at least in part on an amount of data to be transferred responsive to processing the given request.

9. The method as recited in claim 8, wherein either:
the first type of request is a read request and the second type of request is a write request; or
the first type of request is a write request and the second type of request is a read request.

10. The method as recited in claim 8, wherein each of the plurality of requests has a corresponding attribute indicative of one of a plurality of priorities.

11. The method as recited in claim 10, wherein said temporary block temporarily causes requests of the first type to have a lowest priority of the plurality of priorities.

12. The method as recited in claim 8, further comprising a table comprising a plurality of entries, wherein each entry of the table identifies at least a type of request, an amount of data, and an attribute indicative of one of a plurality of priorities.

13. The method as recited in claim 8, further comprising determining the given period of time based on a predicted amount of time to receive read response data when processing the given request as a read request.

14. The method as recited in claim 12, wherein each entry of the table further identifies the given period of time.

15. A non-transitory computer readable storage medium storing program instructions, wherein the program instructions are executable by a processor to:
- receive a plurality of requests comprising at least a first type of request and a second type of request;
- store the plurality of requests;
- select a given request of the plurality of requests for processing, the given request corresponding to the first type of request;
- temporarily block selection of requests of a same memory access type as the first type for processing, wherein the temporary block is for a given period of time that is determined based at least in part on an amount of data to be transferred responsive to processing the given request.

16. The non-transitory computer readable storage medium as recited in claim 15, wherein each of the plurality of requests has a corresponding attribute indicative of one of a plurality of priorities.

17. The non-transitory computer readable storage medium as recited in claim 16, wherein said temporary block temporarily causes requests of the first type to have a lowest priority of the plurality of priorities.

* * * * *